(12) United States Patent
Ramirez Llanos et al.

(10) Patent No.: US 11,941,843 B2
(45) Date of Patent: Mar. 26, 2024

(54) METHOD AND DEVICE FOR DETECTING A TRAILER

(71) Applicant: Continental Automotive Systems, Inc., Auburn Hills, MI (US)

(72) Inventors: Eduardo Jose Ramirez Llanos, Rochester, MI (US); Dominik Froehlich, Ferndale, MI (US); Brandon Herzog, Waterford, MI (US); Ibro Muharemovic, Warren, MI (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 330 days.

(21) Appl. No.: 17/305,707

(22) Filed: Jul. 13, 2021

(65) Prior Publication Data

US 2023/0014188 A1  Jan. 19, 2023

(51) Int. Cl.
*G06T 7/73* (2017.01)
*G06V 10/44* (2022.01)
*G06V 20/56* (2022.01)

(52) U.S. Cl.
CPC .............. *G06T 7/74* (2017.01); *G06V 10/443* (2022.01); *G06V 20/56* (2022.01); *G06T 2207/30252* (2013.01)

(58) Field of Classification Search
CPC ........... G06T 7/194; G06T 7/215; G06T 7/70; G06T 7/73; G06T 7/74; G06T 2207/30252; G06V 10/443; G06V 10/74; G06V 10/75; G06V 10/751; G06V 10/7515; G06V 10/761; G06V 20/56; B60R 1/003; B62D 13/00; G06F 17/15
See application file for complete search history.

(56) References Cited

U.S. PATENT DOCUMENTS

2019/0335100 A1  10/2019  Chen et al.
2020/0356788 A1  11/2020  Joseph et al.
2021/0201531 A1*  7/2021  Creaby et al. ............ G06T 7/74

OTHER PUBLICATIONS

The International Search Report and the Written Opinion of the International Searching Authority dated Nov. 8, 2022 on for the counterpart PCT Application No. PCT/US2022/073673.

* cited by examiner

*Primary Examiner* — Andrew W Johns

(57) ABSTRACT

A method for determining a location of a trailer in an image includes obtaining at least one real-time image from a vehicle. The at least one real-time image is processed with a controller on the vehicle to obtain a feature patch describing at least one real-time image. A convolution is performed of the feature patch and each filter from a set of filters with the filter being based on data representative of known trailers. A location of a trailer is determined in the at least one real-time image based on the convolution between the feature patch and each filter from the set of filters.

20 Claims, 5 Drawing Sheets

METHOD AND DEVICE FOR DETECTING A TRAILER

BACKGROUND

The present disclosure relates to detecting a position of a trailer in relation to a vehicle attached to the trailer. The trailer is attached to the vehicle through a tow hitch point that allows the trailer to pivot around as the vehicle moves. This is especially true when the vehicle is turning while moving forward or in reverse. The tow hitch includes a tow ball, or other form of attachment, that is generally attached to a receiver on a rear of the vehicle.

As a vehicle is reversing, the vehicle may assist the driver in positioning the trailer. The driver must continually monitor an angle of the trailer to ensure that the trailer is heading towards a desired location and is not rotating to a degree that would result in the trailer contacting a rear portion of the vehicle. The vehicle may provide a predicted path of travel for the trailer based on current position or control steering of the vehicle to place the trailer in a desired location.

SUMMARY

In one exemplary embodiment, a method for determining a location of a trailer in an image includes obtaining at least one real-time image from a vehicle. The at least one real-time image is processed with a controller on the vehicle to obtain a feature patch (f) describing at least one real-time image. A convolution is performed of the feature patch (f) and each filter (h) from a set of filters (H) with the filter (h) being based on data representative of known trailers. A location of a trailer is determined in the at least one real-time image based on the convolution between the feature patch (f) and each filter (h) from the set of filters (H).

In another embodiment according to any of the previous embodiments, determination for the location of the trailer includes utilizing an algorithm on the controller that identifies a location of highest probability of the location of the trailer through a voting process.

In another embodiment according to any of the previous embodiments, the voting process identifies at least one pixel in the real-time image from the vehicle with the greatest correlation to the location of the trailer from the set of filters (H).

In another embodiment according to any of the previous embodiments, determining the location of the trailer includes aligning the trailer with the vehicle.

In another embodiment according to any of the previous embodiments, the at least one real time image includes consecutive real-time images. Reducing a search area of the consecutive real-time images includes comparing the consecutive real-time images to identify areas with objects that did not move between the consecutive images and searching the areas with objects that did not move when the vehicle is moving and the trailer is in alignment with the vehicle.

In another embodiment according to any of the previous embodiments, the set of filters (H) is stored in memory of the controller on the vehicle.

In another embodiment according to any of the previous embodiments, the set of filters (H) includes an optimization of at least one image of multiple known trailers.

In another embodiment according to any of the previous embodiments, the set of filters (H) is performed by a computing device having a greater computing power than a computing power of the controller on the vehicle.

In another embodiment according to any of the previous embodiments, the at least one real-time image is captured by a camera on a rear of the vehicle.

In another embodiment according to any of the previous embodiments, a location of the trailer is received and identified on a display by a user.

In another embodiment according to any of the previous embodiments, the set of filters (H) is developed based on an algorithm evaluating extracted features from a database of rear-view images of the vehicle.

In another embodiment according to any of the previous embodiments, the extracted features include at least one of a histogram of oriented gradients ("HOG"), Color Names, RGB, or grayscale.

In another embodiment according to any of the previous embodiments, the set of filters (H) is developed based on an algorithm that identifies learned features from a database of rear-view images of the vehicle.

In another exemplary embodiment, a trailer identification assembly includes a camera for capturing images of a trailer and a controller configured for obtaining at least one real-time image from the camera on the vehicle. The at least one real-time image is processed with a controller on the vehicle to obtain a feature patch (f) describing the at least one real-time image. A convolution is performed of the feature patch (f) and a set of filters (H) with the filter (h) being based on data representative of known trailers. A location of the trailer in the at least one real-time image is determined based on the convolution between the feature patch (f) and each filter (h) from the set of filters (H).

In another embodiment according to any of the previous embodiments, the set of filters (H) is stored in memory of the controller on the vehicle. The set of filters (H) includes an optimization of multiple images of known trailers fixed to the vehicle and performing the convolution between the feature patch (f) with each filter (h) from the set of filters (H), which produces a probability of the trailer position in the image.

In another embodiment according to any of the previous embodiments, the set of filters (H) is developed based on an algorithm evaluating extracted features from a database of rear-view images of the vehicle.

In another embodiment according to any of the previous embodiments, the extracted features include at least one of a histogram of oriented gradients ("HOG"), Color Names, RGB, or grayscale.

In another embodiment according to any of the previous embodiments, the set of filters (H) is developed based on an algorithm that identifies learned features from a database of rear-view images of the vehicle.

In another embodiment according to any of the previous embodiments, determining the location of the trailer includes utilizing an algorithm on the controller that identifies a location of highest probability of the location of the trailer through a voting process.

In another embodiment according to any of the previous embodiments, determining the location of the trailer includes aligning the trailer with the vehicle. The at least one real time image includes consecutive real-time images. Reducing a search area of the consecutive real-time images includes comparing the consecutive real-time images to identify areas with objects that did not move between the consecutive images and searching the areas with objects that did not move when the trailer and the vehicle are aligned.

BRIEF DESCRIPTION OF THE DRAWINGS

The various features and advantages of the present disclosure will become apparent to those skilled in the art from the following detailed description. The drawings that accompany the detailed description can be briefly described as follows.

DESCRIPTION

Figure 1:
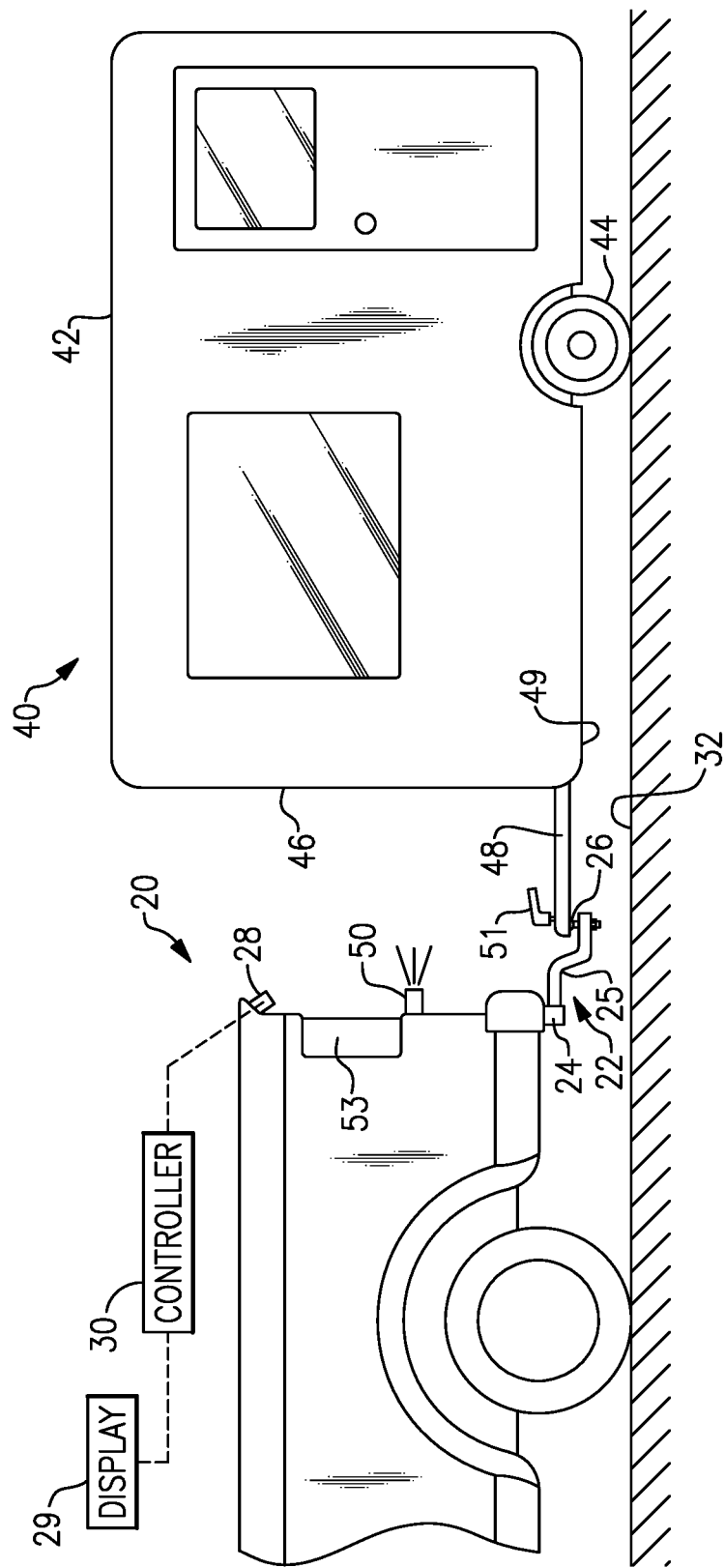
FIG. 1 illustrates an example vehicle attached to a trailer.

It is common today for vehicles 20 to be used in towing a trailer 40 on a drivable surface 32, such as a road or a parking area. In order to do so, the vehicle 20 much include a tow hitch 22 that is fixed relative to the vehicle 20. In one example, the tow hitch 22 is attached to the vehicle 20 by a receiver 24 fixed to a rear portion of the vehicle 20. In the illustrated example shown in FIG. 1, the tow hitch 22 includes a ball mount 25 for supporting a ball 26 adjacent a first end and attaching to the receiver 24 adjacent a second end. The ball mount 25 is removeable attached to the receiver 24 and may be retained by a pin. The ball 26 on the tow hitch 22 is used to form a connection with a trailer 40 to allow the trailer 40 to rotate around the ball 26 while maneuvering the vehicle 20, particularly when turning or reversing the vehicle 20.

In the illustrated example, the trailer 40 includes a body portion 42 supported by an axle that rotatably supports wheels 44. The body portion 42 can include an enclosure, such as with a recreation vehicle, for occupants or the body portion 42 can include an open cargo carrying platform. In both instances, the body portion 42 would include a front face 46 that faces the vehicle 20. The front face 46 extends upward from a base portion 49 of the trailer 40 and could extend upward and in a downstream direction with the flow of air of the trailer 40 such that the surface is not vertical. A tongue 48 extends forward of the body portion 42 to form an attachment with the ball 26 to allow the trailer 40 to pivot about the ball 26 on the vehicle 20. The tongue 48 is fixed to the ball 26 by a latch 51 that includes a handle used to clamp the latch 51 onto the ball 26.

Figure 2:
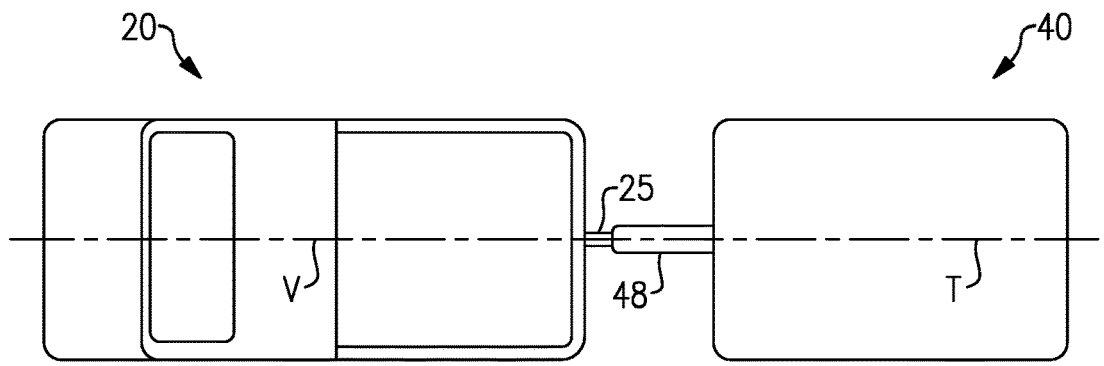
FIG. 2 illustrates an overhead view of the vehicle and trailer of FIG. 1.
Figure 3A:
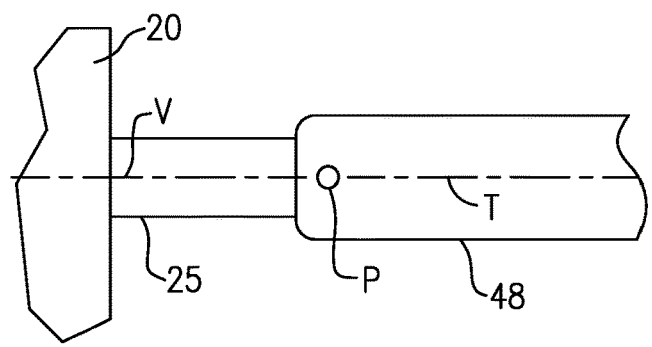
FIG. 3A illustrates an enlarged view of the trailer attached to the vehicle with the trailer and the vehicle in alignment.
Figure 4A:
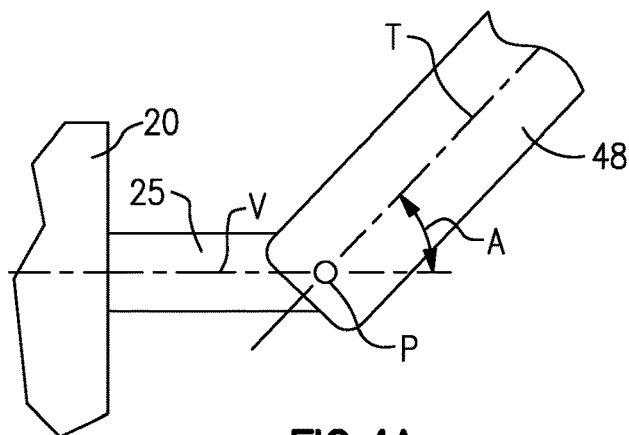
FIG. 4A illustrates another enlarged view of the trailer attached to the vehicle with the trailer angled relative to the vehicle.
Figure 3B:
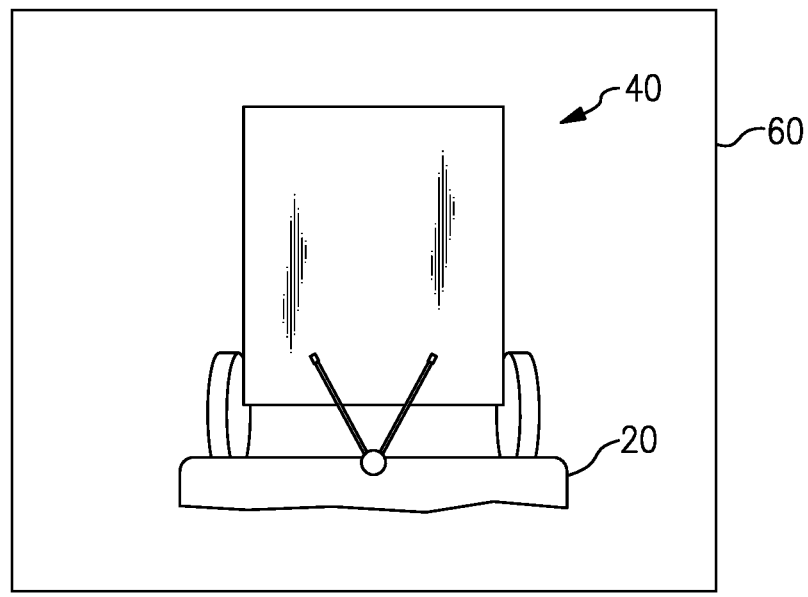
FIG. 3B illustrates an image of the trailer and the vehicle in alignment.
Figure 4B:
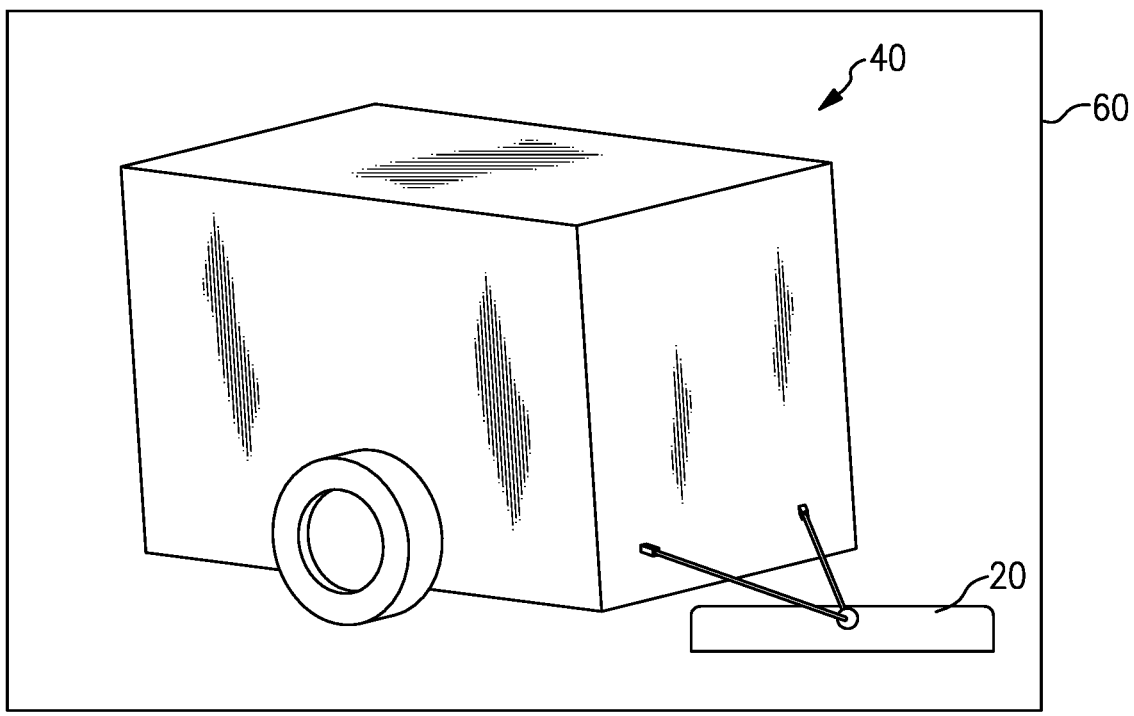
FIG. 4B illustrates an image of the trailer attached to the vehicle with the trailer angled relative to the vehicle.

FIGS. 2-4 illustrate the trailer 40 in alignment with the vehicle 20. In the orientation shown in FIGS. 2-4, a central longitudinal axis V of the vehicle 20 extends through the tow ball 26 and is aligned in an overlapping configuration with a central longitudinal axis T of the trailer 40 that also extends through the tow ball 26. As shown in FIGS. 2, 3A, and 3B, the tongue 48 and the trailer 40 rotate about the pivot point P. The pivot point P corresponds to a central vertical axis through the tow ball 26. As the trailer 40 pivots about the pivot point P, an angle A is generated between the central longitudinal axis V of the vehicle 20 and the central longitudinal axis T of the trailer 40 as shown in FIGS. 4A-4B. If the angle A becomes too large, the trailer 40 may contact a rear portion of the vehicle 20 or the trailer 40 may no longer move in the desired direction.

Figure 5:
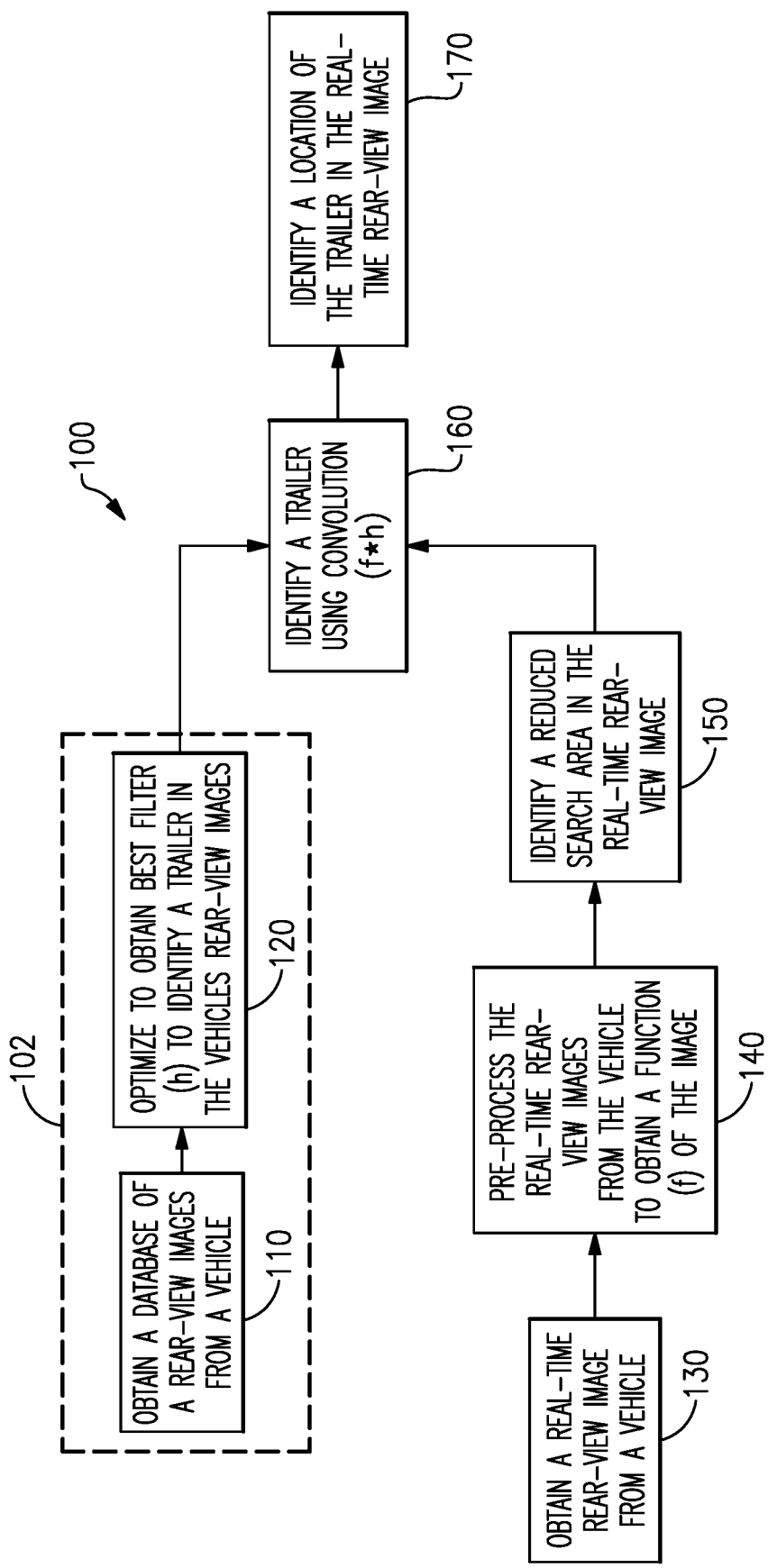
FIG. 5 illustrates an example method of determining a location of the trailer in an image.
Figure 7:
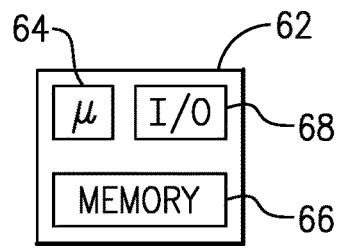
FIG. 7 illustrates an example computing device.

FIG. 5 illustrates an example method 100 for determining a location of the trailer 40 in the image 60 in real time. A portion 102 of the method 100 is performed offline or remote from the vehicle 20 and stored in memory on the controller 30 (FIG. 7) for use by the controller 30 to determine the location of the trailer 40 in real time. In the example method 100, the portion 102 is performed on a higher-powered computing device 62 (FIG. 7), while the controller 30 performs the remaining steps with a microprocessor onboard the controller 30. The controller 30 differs from the computing device 62 in that the controller 30 does not possess as high of a level of computing power as the computing device 62. For example, the onboard controller 30 may be a single Central Processing Unit (CPU) and does not need to any hardware accelerators, such as a Vision Processing Unit (VPU), or a Graphics Processing Unit (GPU). As shown in FIG. 7, the computing device 62 includes memory 66 for storing data, a microprocessor 64, and an input/output 68.

The portion 102 requires the higher-powered computing device 62 to perform the steps 110 and 120 because the controller 30 is not capable of performing the steps 110 and 120 on a real-time basis that would be helpful to a user of the vehicle 20. However, as will be described in greater detail below, the controller 30 is nevertheless able to identify the location of the trailer 40 in the real-time images 60 because the controller 30 can access the data calculated by the higher-powered computing device 62 stored in the memory of the controller 30.

Figure 6:
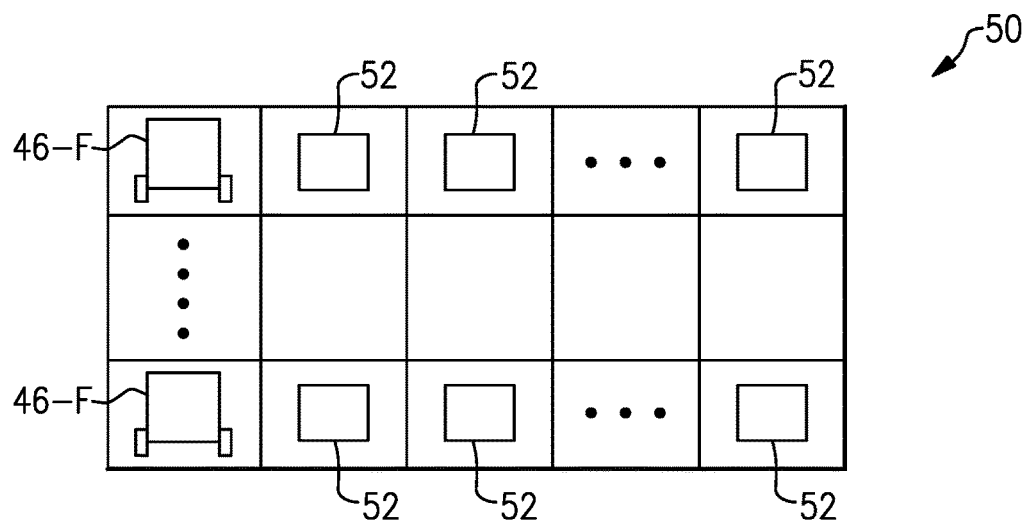
FIG. 6 illustrates an example database of trailers.

To perform the portion 102 of the method 100, the high-powered computing device 62 obtains access to a database 50 (FIG. 6) of rear-view images 52. The database 50 includes images from the rear-view camera 28 of the vehicle 20 with known trailer front faces 46-F (step 110). The information included in the database 50 about the known trailer front faces 46-F can include the position (in pixels) on the image 52. Additionally, for each known trailer front face 46-F, the database 50 may include a single rear-view image 52 or a series of sequential rear-view images 52 that assist in identifying elements on the front face 46 of the trailer 40 that are at fixed locations between images 52.

For each image in the rear-view images 52 from the database 50, the computing device 62 performs an optimization to obtain the best filter (h) to identify the trailer 40 in the rear-view image 60 of the vehicle 20 (step 120). The domain of the filter (h) is given in pixels, whose size, width and height, is given by the size of the training region. When different filters (h) are grouped together, it is referred as a set of filters (H). The optimization is performed through an algorithm. In one example, the algorithm extracts a feature patch (f), such as a histogram of oriented gradients ("HOG"), Color Names, RGB, and/or grayscale, for each image 52 in the database 50 to characterize the known trailer front faces 46-F. The algorithm performs the optimization by looking at the extracted feature patch (f) in a training region of the image 52 and the given tow ball location information (ground truth) stored in the database 50. The training region of the image 52 includes a given height and width in pixels. The algorithm outputs the learned filter (h) for each rear-view images 52 from the database 50.

In another example of (step 120), the computing device 62 can use another algorithm to identify its own learned features (f) to optimize and obtain the best filter (h) from the rear-view images 52. The algorithm under this example will identify the learned features (f) by examining different scenarios displaying the trailer 40 in the images 52 instead of looking at the specific extracted features identified above in the other example algorithm. Given an initial condition of the extracted features (f), the algorithm gets the filter (h) (as shown in the previous example). Next, the algorithm fixes the filter (h) found in the previous step to optimize and obtain a new feature patch (f). This process is repeated until the change on the feature patch (f) and/or the filter (h) is under a predetermined threshold or a maximum number of iterations is achieved. In this example, note that step 140 must use its own learned features (f).

At step 130, the controller 30 receives the image 60 in real time from the camera 28 of a rear-view of the vehicle 20. Once the controller 30 has received at least one real-time image 60 from the rear-view camera 28, the controller 30 can pre-process the image 60 to extract features (f) describing the image 60 (step 140). Some examples of a feature patch (f) may be a histogram of oriented gradients ("HOG"), Color Names, RGB, and/or grayscale The image 60 can be divided into patches or small segments for the controller 30 to identify the most relevant patches or segments to search in the image 60 (step 150). The controller 30 may identify the most relevant patches to search by identifying objects that did not move between consecutive rear-view images 60 from the camera 28 when the vehicle 20 and the trailer 40 are in alignment. Identifying areas where objects did not move between consecutive areas helps to reduce the search area to identify the location of the trailer 40 because the trailer 40 does not move between consecutive images when in alignment with the vehicle 20 relative to the camera 28 while the surrounding environment will if the vehicle 20 is moving.

The controller 30 then performs a 2D convolution between the extracted feature patch (f) (from step 140) and for each filter (h) (from step 120). The last process is done for each image in the database 50 and each patch the controller 30 generated from the rear-view image 60 (step 160). In one example, the database may include between 1000 and 3000 images from the vehicles rear view camera 28 of trailers 40. A one dimensional convolution is a mathematical operation on two functions (f and h) that produces a third function (f ★ h) that expresses how the shape of one is modified by the other. The term convolution refers to both the result function and to the process of computing it. It is defined as the integral of the product of the two functions after one is reversed and shifted. And the integral is evaluated for all values of shift, producing the convolution function. A 2D convolution is just an extension of the one dimensional convolution by convolving both horizontal and vertical directions in 2-dimensional spatial domain.

The controller 30 utilizes an algorithm with a voting process that identifies the position of high probability corresponding to the location of the trailer 40 in the rear-view image 60. The voting process identifies a region of pixels or a single pixel in the image 60 with the greatest correlation to the location of the trailer 40 using each filter (h) learned in step 120. One advantage of performing the convolution to each patch, is that the algorithm can be run in real time on the controller 30 without the need for a high-end processor, like with the computing device 62. The voting process can also occur when the trailer 40 and the vehicle 20 are in alignment to initially identify the trailer.

Figure 8:
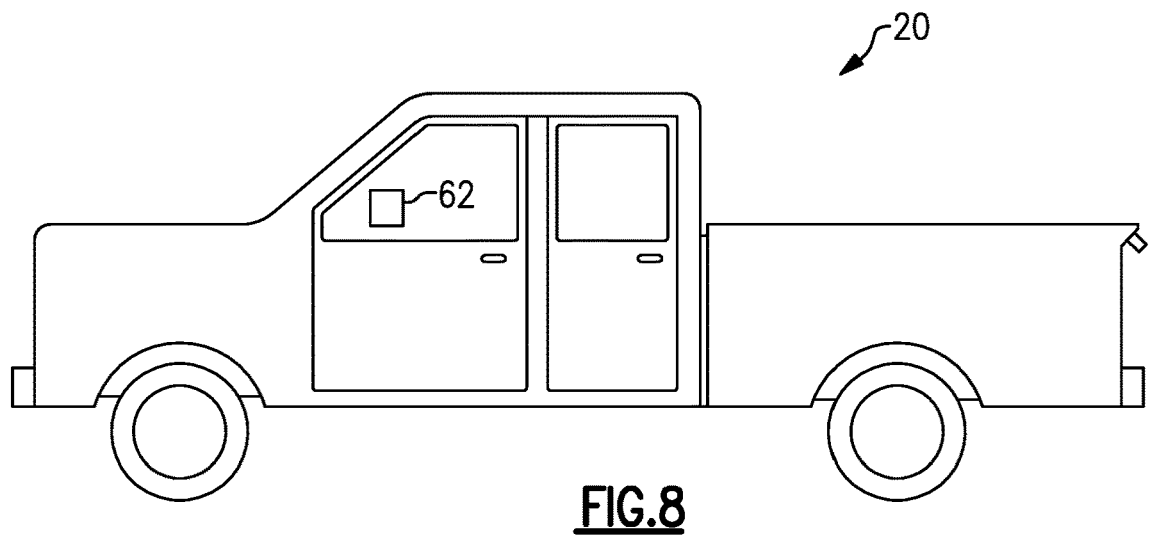
FIG. 8 illustrates a schematic view of the vehicle from FIG. 1.

The method 100 may also incorporate a calibration process to aid in selecting the correct location of the trailer 40. In the calibration process, a user may select a location of the trailer 40 on a display 72 (FIG. 8) projecting the rear-view image 60. The display 72 may be a touch screen display to allow the user to select the location of the tow ball 26 through touching the portion of the display 72 showing the tow ball 26. The controller 30 can then perform the steps above to verify the location of the front face of the trailer 40.

Once the controller 30 has identified the location of the trailer 40 by performing the steps of the method 100 above, the location of the trailer 40 can be presented on the display 72 or used by the controller 30.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A method for determining a location of a trailer in an image, the method comprising:
   obtaining, from a camera by a controller comprising at least one microprocessor, at least one real-time image from a vehicle;
   processing, by the at least one microprocessor, the at least one real-time image to obtain a feature patch describing at least one real-time image;
   performing, by the at least one microprocessor, a convolution of the feature patch and each filter from a set of filters with the set of filters being based on data representative of known trailers;
   determining, by the at least one microprocessor, a location of a trailer in the at least one real-time image based on the convolution between the feature patch and each filter from the set of filters; and
   at least one of sending, by the at least one microprocessor, and determined trailer location to a vehicle display for displaying the determined location of the trailer, or using, by the at least one microprocessor, the determined location of the trailer in a trailer assist operation,
   wherein determining the location of the trailer includes utilizing an algorithm on the controller executed by the at least one microprocessor that identifies a location of highest probability of the location of the trailer, and
   wherein the at least one real time image includes consecutive real-time images and the method further includes reducing, by the at least one microprocessor, a search area of the consecutive real-time images including comparing the consecutive real-time images to identify areas with objects that did not move between the consecutive images and searching the areas with objects that did not move when the vehicle is moving and the connected trailer is in alignment with the vehicle.

2. The method of claim 1, wherein the algorithm is used to identify the location of highest probability of the location of the trailer through a voting process.

3. The method of claim 2, wherein the voting process identifies at least one pixel in the real-time image from the vehicle with the greatest correlation to the location of the trailer from the set of filters.

4. The method of claim 2, wherein determining the location of the trailer includes aligning the trailer with the vehicle.

5. The method of claim 1, wherein the set of filters is stored in memory of the controller on the vehicle.

6. The method of claim 5, wherein the set of filters includes an optimization of at least one image of multiple known trailers.

7. The method of claim 5, further comprising performing an optimization on the set of filters a computing device comprising at least one microprocessor having a greater computing power than a computing power of the controller on the vehicle, the optimization resulting in obtaining a best filter to identify the trailer.

8. The method of claim 1, wherein the at least one real-time image is captured by the camera mounted on a rear of the vehicle.

9. The method of claim 1, including receiving, by the at least one microprocessor, a location of the trailer identified on a display by a user.

10. The method of claim 1, wherein the set of filters is developed based on an algorithm evaluating extracted features from a database of rear-view images of the vehicle.

11. The method of claim 10, wherein the extracted features include at least one of a histogram of oriented gradients, Color Names, RGB, or grayscale.

12. The method of claim 1, wherein the set of filters is developed based on an algorithm that identifies learned features from a database of rear-view images of the vehicle.

13. A trailer identification assembly comprising:
a camera for capturing images of a trailer; and
a controller located in a vehicle and comprising at least one processor configured for:
obtaining at least one real-time image from the camera on the vehicle;
processing the at least one real-time image with the at least one processor on the vehicle to obtain a feature patch describing the at least one real-time image;
performing, by the at least one processor, a convolution of the feature patch and a set of filters with the set of filters being based on data representative of known trailers;
determining, by the at least one processor, a location of the trailer in the at least one real-time image is based on the convolution between the feature patch and each filter from the set of filters; and
at least one of sending, by the at least one microprocessor, and determined trailer location to a vehicle display for displaying the determined location of the trailer, or using, by the at least one microprocessor, the determined location of the trailer in a trailer assist operation,
wherein determining the location of the trailer includes utilizing an algorithm on the at least one processor that identifies a location of highest probability of the location of the trailer, and
wherein the at least one real time image includes consecutive real-time images and the at least one processor is configured to reduce a search area of the consecutive real-time images including comparing the consecutive real-time images to identify areas with objects that did not move between the consecutive images and searching the areas with objects that did not move when the vehicle is moving and the connected trailer are aligned.

14. The assembly of claim 13, wherein the set of filters is stored in memory of the controller on the vehicle and the set of filters includes an optimization of multiple images of known trailers fixed to the vehicle and the at least one processor is configured for performing the convolution between the feature patch with each filter from the set of filters, which produces a probability of the trailer position in the image.

15. The assembly of claim 13, wherein the set of filters is developed based on an algorithm evaluating extracted features from a database of rear-view images of the vehicle.

16. The assembly of claim 15, wherein the extracted features include at least one of a histogram of oriented gradients, Color Names, RGB, or grayscale.

17. The assembly of claim 13, wherein the set of filters is developed based on an algorithm that identifies learned features from a database of rear-view images of the vehicle.

18. The assembly of claim 13, wherein the algorithm identifies the location of highest probability of the location of the trailer through a voting process.

19. A method for determining a location of a trailer in an image, the method comprising:
obtaining, by a controller comprising at least one microprocessor, at least one real-time image captured by a vehicle camera;
processing, by the at least one microprocessor, the at least one real-time image to obtain a feature patch describing the at least one real-time image;
performing, by the at least one microprocessor, a convolution of the feature patch and each filter from a set of filters with the filters of the set of filters being based on data representative of known trailers, the convolution of the feature patch and each filter from the set of filters comprising an integral of a product of the feature patch and the filter after at least one of the feature patch or the filter is reversed and shifted;
determining, by the at least one microprocessor, a location of a trailer in the at least one real-time image based on the convolution between the feature patch and each filter from the set of filters, comprising using a voting process to identify a region of pixels or a single pixel in the at least one real-time image with a greatest correlation to the location of the trailer using each filter; and
at least one of sending, by the at least one microprocessor, the determined trailer location to a vehicle display for displaying the determined location of the trailer, or using, by the at least one microprocessor, the determined location of the trailer in a trailer assist operation.

20. The method of claim 19, wherein the at least one real time image includes consecutive real-time images and the method further includes reducing, by the at least one microprocessor, a search area of the consecutive real-time images including comparing the consecutive real-time images to identify areas with objects that did not move between the consecutive images and searching the areas with objects that did not move when the vehicle is moving and the trailer connected to the trailer is in alignment with the vehicle.

* * * * *